(12) United States Patent
Bright

(10) Patent No.: US 6,308,757 B1
(45) Date of Patent: Oct. 30, 2001

(54) METHOD AND APPARATUS FOR INCREASING TRACTION OF A WHEEL

(75) Inventor: Donald A. Bright, Cleveland, TN (US)

(73) Assignee: Flex-Trax, Inc., Cleveland, TN (US)

( * ) Notice: Subject to any disclaimer, the term of this patent is extended or adjusted under 35 U.S.C. 154(b) by 0 days.

(21) Appl. No.: 09/289,195

(22) Filed: Apr. 9, 1999

Related U.S. Application Data (60) Provisional application No. 60/081,444, filed on Apr. 10, 1998.

(51) Int. Cl.[7] .................................................. B60C 11/00
(52) U.S. Cl. ....................... 152/221; 152/213 A; 152/172
(58) Field of Search ................................ 152/208, 213 R, 152/214, 216, 213 A, 221, 223, 217, 218, 219, 167, 170, 171, 172, 173, 175; 301/38.1, 41.1

(56) References Cited

U.S. PATENT DOCUMENTS

| | | | |
|---|---|---|---|
| D. 76,240 | * 9/1928 | Heltzel | 152/221 |
| 1,680,569 | * 8/1928 | Richie | 152/221 |
| 1,783,161 | * 11/1930 | Stewart | 152/221 |
| 1,859,656 | * 5/1932 | Cunnington | 152/221 |
| 1,887,404 | * 11/1932 | Gerald | 152/221 |
| 2,058,799 | * 10/1936 | Jacks | 152/213 R |
| 2,865,422 | * 12/1958 | Royer | 152/213 R |
| 3,770,039 | 11/1973 | Pfoertner . | |
| 4,416,319 | * 11/1983 | Hofmann | 152/213 R |
| 5,167,737 | 12/1992 | Sakuma . | |
| 5,247,980 | * 9/1993 | Haruda et al. | 152/213 R |
| 5,249,615 | * 10/1993 | Suzuki | 152/185 |
| 5,267,596 | * 12/1993 | Logar et al. | 152/179 |

FOREIGN PATENT DOCUMENTS

| | | |
|---|---|---|
| 2720147A | 11/1978 | (DE) . |
| 2810406A | 9/1979 | (DE) . |
| 0519213A | 12/1992 | (EP) . |
| 2088508 | 1/1972 | (FR) . |

OTHER PUBLICATIONS

Advertisement showing cold–flexible and durable snow chains from PU protect both road and wheels; p. 15.

* cited by examiner

*Primary Examiner*—S. Joseph Morano
*Assistant Examiner*—Long Bao Nguyen (57) ABSTRACT

A traction device includes a polygonal member having a number of attachment regions and a chamber with a predetermined number of sides. The chamber is disposed within a central region of the polygonal member. The number of attachment regions of the traction device is substantially equal to the predetermined number of the sides. Each chamber of the traction device is capable of dispersing at least one of fluids, solids, and fluid-solid mixtures.

24 Claims, 7 Drawing Sheets

METHOD AND APPARATUS FOR INCREASING TRACTION OF A WHEEL

35 U.S.C. §119(e) CLAIM TO A PROVISIONAL U.S. APPLICATION

This application claims the benefit of U.S. Provisional Application No. 60/081,444 filed Apr. 10, 1998.

BACKGROUND OF THE INVENTION

1. Field of the Invention

The present invention generally relates to a traction device that is capable of being operatively linked to a wheel. More specifically, the present invention can be attached to tires of a motor vehicle to substantially increase traction thereof.

2. Description of the Background Art

Devices currently exist to increase traction for tires of motor vehicles during adverse driving conditions. Such devices included lug members or projections extending outwardly from a tire that penetrate through at least one of fluids, solids and fluid-solid mixtures adjacent to the tire. Grooves that exist between the lug members and/or projections become filled with the aforementioned fluids, solids, and fluid/solid mixtures and render such devices ineffective for increasing traction of the tire.

Other devices for increasing traction of the vehicle tire include snow chains which encapsulate the vehicle tire. While snow chains do provide for increased traction of a tire, they have the draw backs of being excessively noisy and being difficult to install around a vehicle tire. Further, local governments in various countries have enacted laws which forbid the use of snow chains due to their detrimental impact on paved surfaces. Snow chains penetrate into paved road surfaces causing costly premature erosion and wear of paved road surfaces. Additionally, snow chains substantially increase the vibrations experienced by a tire and therefore snow chains significantly degrade the riding performance of a motor vehicle.

Other conventional traction devices include planar tread segments which are not attached to the wheels of a vehicle and are placed under the wheels when a vehicle is stuck in either mud, snow, or ice. Such planar tread devices are frequently left behind by a user in order to reduce the risk of the vehicle becoming stuck in mud, snow, or ice which lies beyond the planar tread devices. Such use of the planar tread devices significantly adds to the cost of the devices as well as raising environmental issues with respect to improper disposal or pollution.

Accordingly, a need in the art exists for a method and apparatus for increasing traction of a wheel on a vehicle that provides for a rapid and simple installation while substantially reducing vibration experienced by a wheel of a vehicle. A further need in the art exists for a method and apparatus for increasing traction of a wheel of a vehicle that do not pollute the environment and do not prematurely erode paved road surfaces. Another need in the art exists for a method and apparatus for increasing traction of a wheel of a vehicle that provides for self cleaning chambers to maximize traction of a vehicle wheel while also providing for a self centering of the traction device disposed on a vehicle wheel.

SUMMARY OF THE INVENTION

Accordingly, it is a primary object of the present invention to provide both a method and apparatus for increasing traction of a wheel of a vehicle that is easily and rapidly installed on a vehicle.

It is a further object of the present invention to provide a method and apparatus for increasing a traction of a wheel of a vehicle that is durable yet nonabrasive to paved road surfaces.

Another object of the present invention is to provide a traction device that includes a chamber which is capable of dispersing at least one of fluids, solids, and fluid-solid mixtures present in a terrain adjacent to a motor vehicle.

It is another object of the present invention to provide a traction device and traction system that is self tensioning and self-centering on a wheel of a vehicle.

Another object of the present invention is to provide a traction device and traction system that is self cleaning when a vehicle tire transverses or penetrates through at least one of fluids, solids, and fluid-solid mixtures.

It is a further object of the present invention to provide a traction device and traction system that generates a smoother ride with a tremendous gripping force while substantially reducing wear on a leading edge of each traction device.

These and other objects of the present invention are fulfilled by providing a traction device comprising: a polygonal member having a number of attachment regions; and a chamber with a predetermined number of sides being disposed within a central region of the polygonal member, the number of attachment regions being substantially equal to the predetermined number of the sides, the chamber being capable of dispersing at least one of fluids, solids, and fluid-solid mixtures.

Moreover, these and other objects of the present invention are fulfilled by a traction system for a wheel comprising: a plurality of traction devices, each traction device including a chamber being capable of dispersing at least one of fluids, solids, and fluid-solid mixtures; and a plurality of attaching devices for operatively linking the plurality of tread devices to at least one wheel of a vehicle, the traction devices substantially increasing traction of the wheel moving through at least one of the fluids, solids, and fluid-solid mixtures.

Additionally, these and other objects of the present invention are fulfilled by a method for increasing traction of a wheel of a vehicle, the method comprising the steps of: operatively linking a plurality of traction devices together; attaching the plurality of traction devices to the wheel of the vehicle; and dispersing at least one of fluids, solids, and fluid-solid mixtures adjacent to the wheel of the vehicle with chambers disposed in the traction devices.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
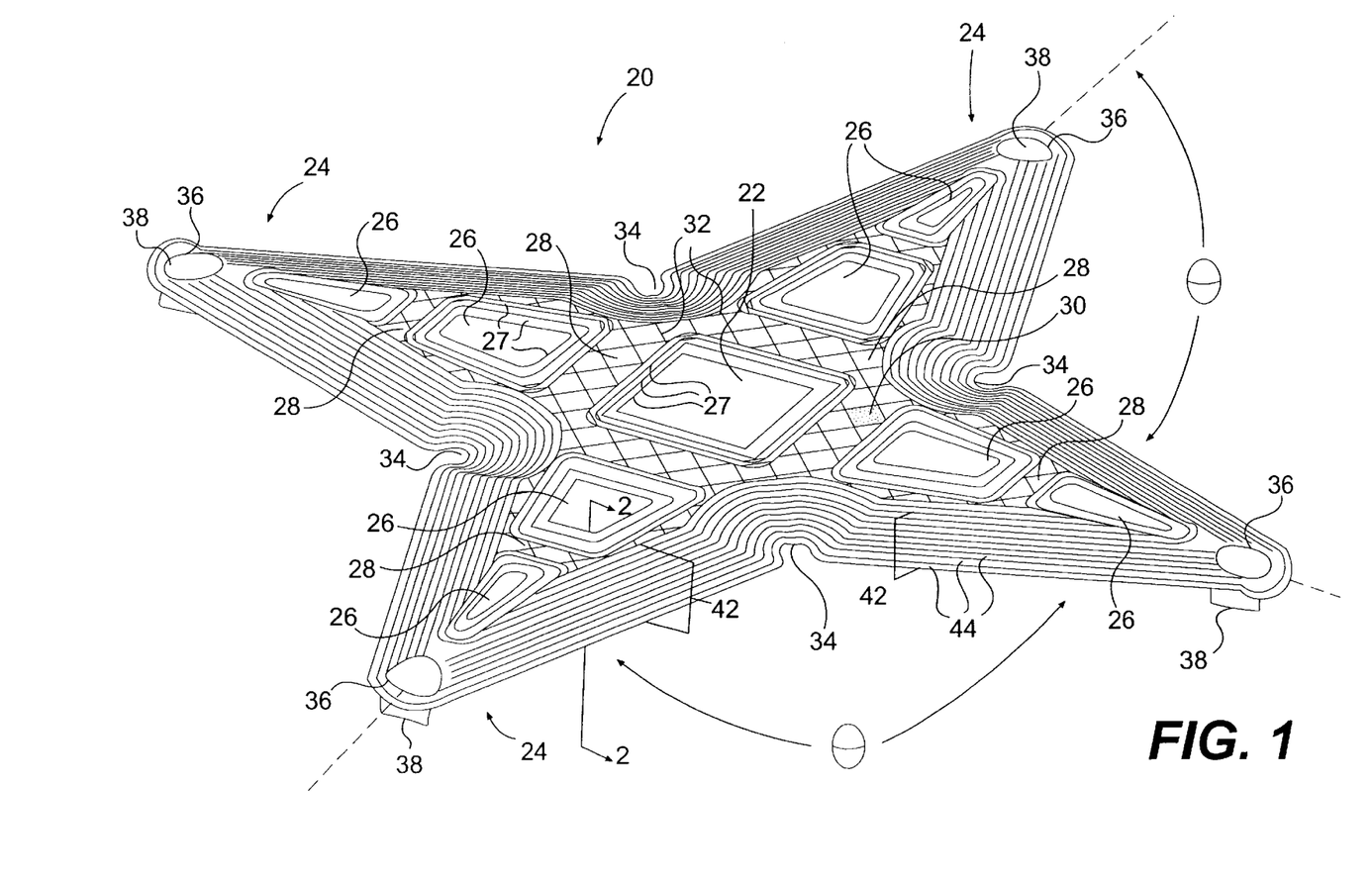
FIG. 1 is a perspective view of a first embodiment of the present invention.

Referring in detail to the drawings and with particular reference to FIG. 1, the traction device 20 of the first embodiment of the present invention is illustrated. Traction device 20 includes a primary chamber 22 disposed within a central region of the polygonal shaped traction device 20. The traction device 20 further includes attachment regions 24 that lie adjacent to the primary chamber 22. Each attachment region 24 has at least one secondary chamber 26 which is disposed adjacent to the primary chamber 22.

The primary and secondary chambers 22, 26 are capable of dispersing at least one of fluids, solids, and fluid/solid mixtures which lay adjacent to a wheel of a motor vehicle. The primary and secondary chambers 22, 26 are designed to equally disperse fluids, solids and fluid/solid mixtures in order to provide a mechanical gripping advantage for a wheel of a motor vehicle. The primary and secondary chambers 22, 26 become pressurized during use by the surface of a wheel of a motor vehicle and the terrain disposed beneath the wheel of a motor vehicle. The pressurization of the primary and secondary chambers 22, 26 provides for a self-cleaning design where fluids, solids and fluid/solid mixtures are released outside of a load zone on the traction device 20.

The primary and secondary chambers 22, 26 are formed by central walls 28 having a predefined thickness. Within the primary and secondary chambers 22, 26 are inverted steps 27. The inverted steps 27 reduce the surface adhesion of fluids, solids, and fluid/solid mixtures that fill the primary and secondary chambers 22, 26 and thus, provide for quick release or rapid ejectment of the fluids, solids, and fluid/solid mixtures as the traction device 20 rotates away from a terrain.

On a tire contacting or terrain contacting surface of the walls 28, a plurality of subchambers 30 are disposed. The subchambers 30 are formed by a plurality of substantially linear projections 32 disposed on walls 28 that intersect at predetermined angles. The subchambers 30 are substantially diamond shaped where the intersection of the substantially linear projections 32 form chevrons. The subchambers 30 and their relative location on the traction device 20 enhance the frictional contact of the traction device 20 on a terrain disposed beneath a wheel of a motor vehicle. The subchambers 30 enhance the friction of the traction device 20 and provide for a rapid release of fluids, solids, and fluid/solid mixtures which lay adjacent to a wheel of a motor vehicle. The subchambers 30 increase the friction (or coefficient of friction—static and kinetic) of the traction device 20 during both forward and reverse rotations of a wheel of a motor vehicle.

An angle $\Theta$ is formed between adjacent attachment regions 24. The angle $\Theta$ formed between adjacent attachment regions 24 is preferably an obtuse angle, but other sized angles are not beyond the scope of the present invention. Other angles include, but are not limited to, right angles, acute angles and other angle sizes. Respective opposing pair of angles $\Theta$ are designed to be aligned with the central circumferential direct region of a wheel of a vehicle.

Figure 4A:
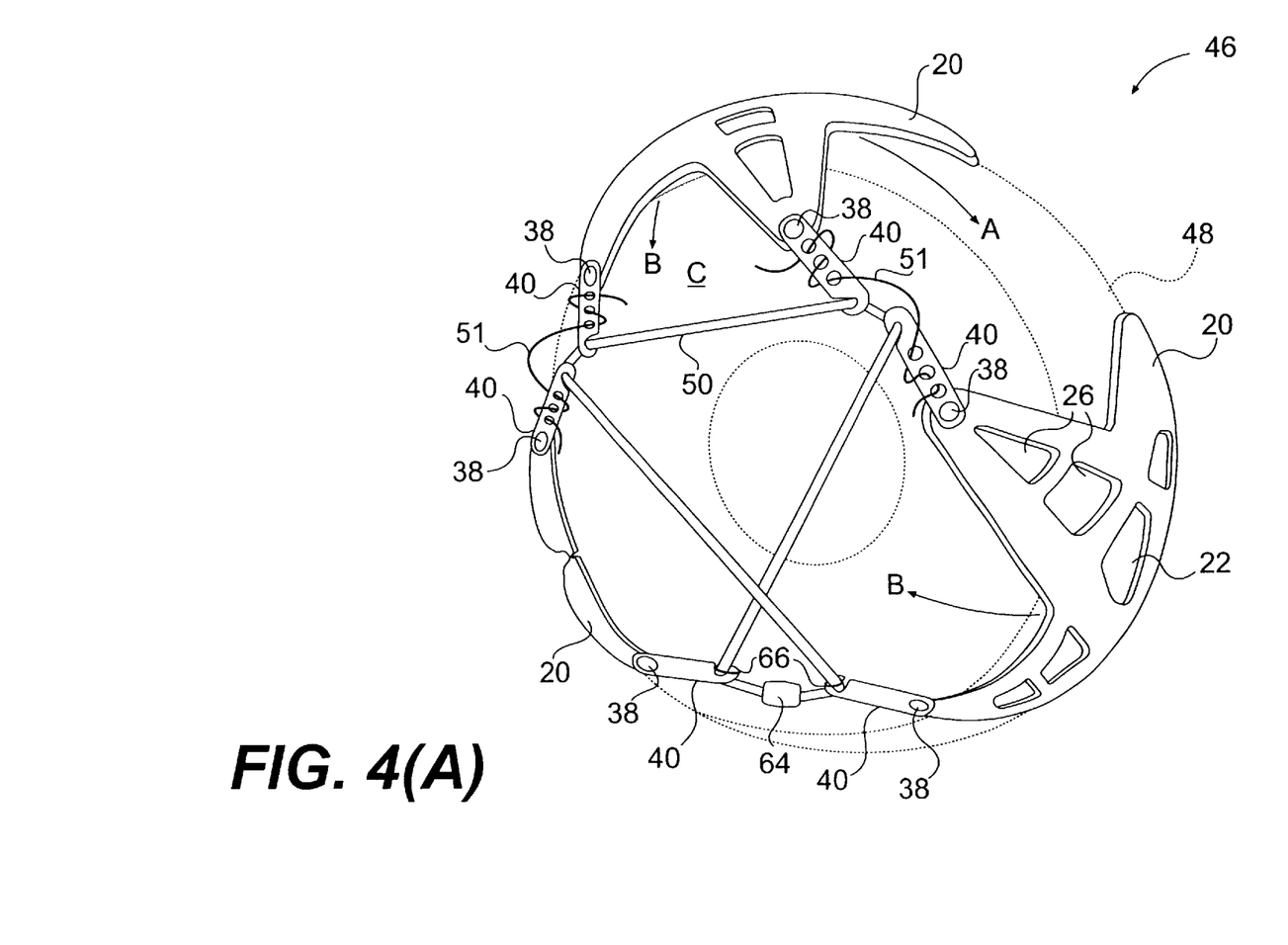
FIG. 4(A) is a perspective view of the second embodiment of the present invention disposed on a vehicle tire.

The angle $\Theta$ is designed to provide for self-centering and self-tracking of the traction device 20 on a wheel of a motor vehicle. During use, one pair of angles $\Theta$ will be aligned substantially parallel with a circumferential direction (as illustrated by directional arrow A of FIG. 4) of a wheel of a motor vehicle while an opposing pair of angles $\Theta$ will be substantially perpendicularly aligned (as illustrated by directional arrow B of FIG. 4) with the circumferential direction of a wheel of a motor vehicle.

The traction device 20 includes a plurality of notches 34. Each notch 34 is disposed at each apex of each deflective angle $\Theta$. The notch 34 is substantially arcuate in shape. However, other shapes are not beyond the scope of the present invention. Each notch is 34 located at stress concentration points of the traction device 20 and permits the attachment regions to readily conform to the shape of a wheel of a vehicle. The notches 34 substantially reduce or prevent splits or tears in the walls 28 adjacent to the primary and secondary chambers 22, 26.

Figure 5:
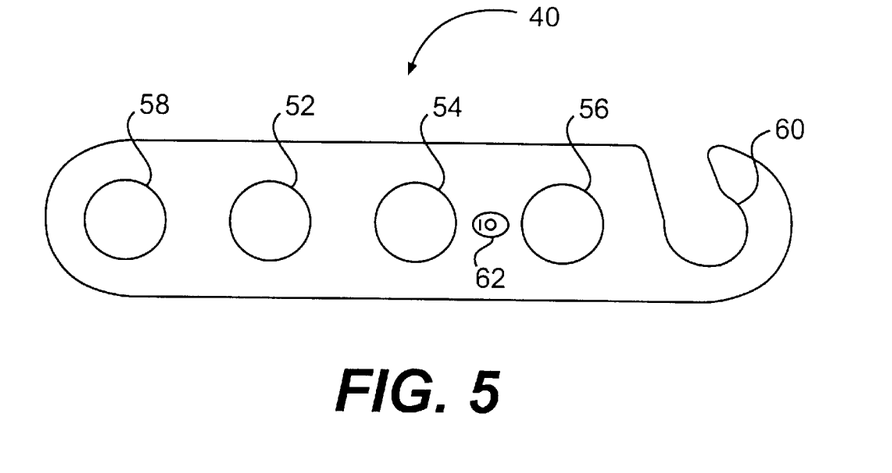
FIG. 5 is a top view of a rope fastening link of the present invention.
Figure 6:
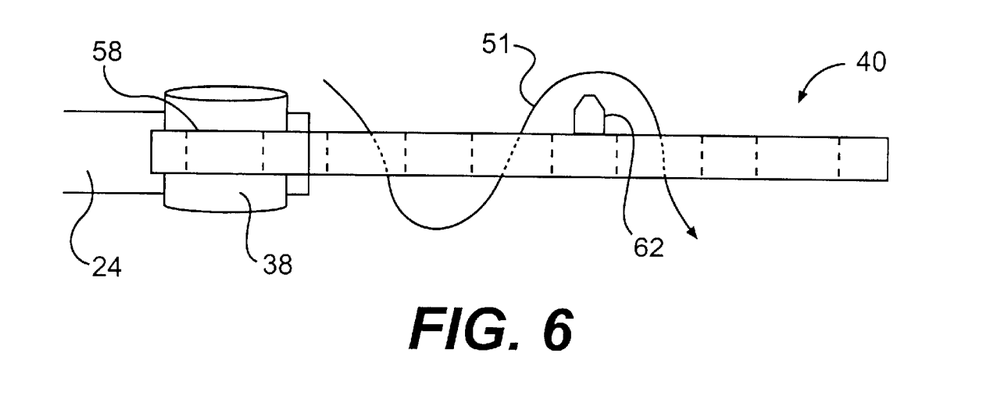
FIG. 6. is a side view of the rope fastening link of the present invention.

Each attachment region 24 includes an aperture 36 disposed at an end portion thereof. A fastening mechanism 38 is disposed within the aperture 36. The fastening mechanism 38 is preferably a lug device which serves as a stand-off for the traction device 20 relative to a wheel of a vehicle. The lug device is preferably substantially cylindrical in shape. However, other shapes are not beyond the scope of the present invention. The fastening mechanism 38 provide a strong and rigid surface area for attachment rope fastening links 40 (as illustrated in FIGS. 4, 5, and 6). The fastening mechanisms 38 also substantially reduce or eliminate contact of fastening hardware with the surface of a wheel of a vehicle.

Figure 2:
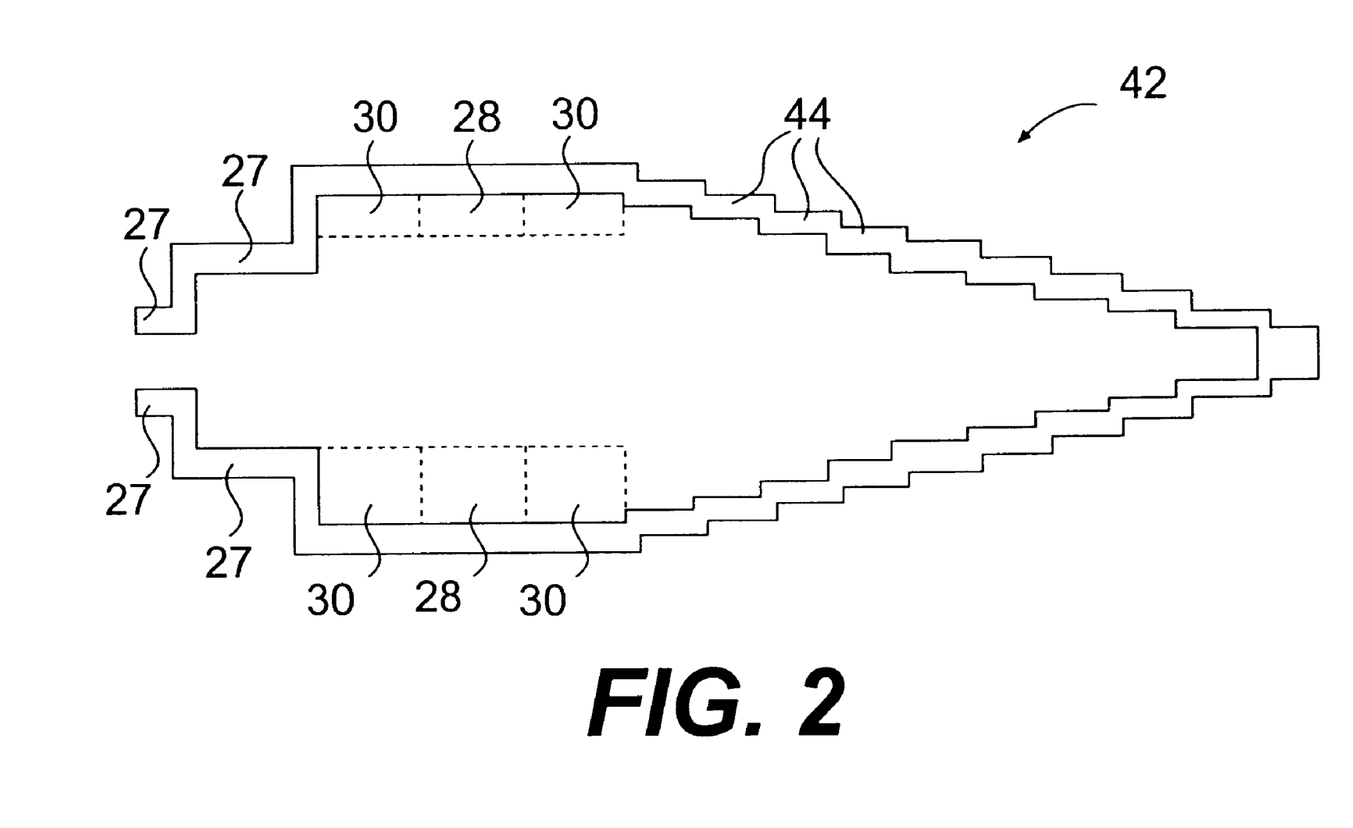
FIG. 2 is a cross-sectional view of a tapered attachment region of the first embodiment of the present invention.

In the first embodiment of the present invention, as illustrated in FIG. 2, the attachment regions 26 have regions 42 of tapering thickness. The regions 42 of tapering thickness are formed by stepped wall transitions 44 that are present around the perimeter of the traction device 20. The stepped transitions 44 provide a smooth surface transition for contact of a wheel of a motor vehicle against the traction device 20 which is pressed between the wheel of a vehicle and the terrain disposed outside of the wheel of the vehicle. The stepped walls 44 substantially increase friction and enhance traction of the traction device 20 while simultaneously increasing the strength and tear resistance of the traction device 20. The attachment regions 24 are preferably V-shaped and have V-shaped cross sections due to the regions 42 of tapering thickness. However, other shapes of the attachment regions and cross sections thereof are not beyond the scope of the present invention.

Traction device 20 is preferably made from an elastomeric compound with a predetermined molecular weight. However, other materials are not beyond the scope of the present invention. Other materials include, but are not limited to, other polymers such as thermoplastic polymers, composite materials, and other like materials. The material for the traction device 20 is selected according to the following parameters: the material for the traction device 20 should increase friction of a wheel of a vehicle while not substantially interfering or degrading the terrain such as paved roads on which the wheel of the vehicle travels; and the material of traction device 20 should be durable for increased product life.

As noted above, the operational environment contemplated for the present invention is for terrain which include fluids, solids, and/or fluid-solid mixtures. Such environments would include, but would not be limited to, mud, snow, sand, ice, rain, water, rock, rough terrains with foliage like trees and grass, and other obstacles associated with terrain of a motor vehicle.

Due to the symmetrical geometric shape as well as substantially identical wheel-contacting and terrain-contacting sides of the traction device 20, the traction device 20 is fully reversible as well as fully rotatable to increase the product life thereof. In other words, after a period of use, the traction device 20 can be flipped over or simply rotated to balance the wear associated with the use of the invention on terrain where the wheel of a motor vehicle travels.

The embodiment illustrated in FIGS. 1 and 2 is preferably designed for highway road use due to the stepped wall transitions 44 which form the tapering thickness regions 42 of attachment regions 24. The stepped wall transitions 44 substantially minimize vibration caused by the traction device 20.

Figure 3:
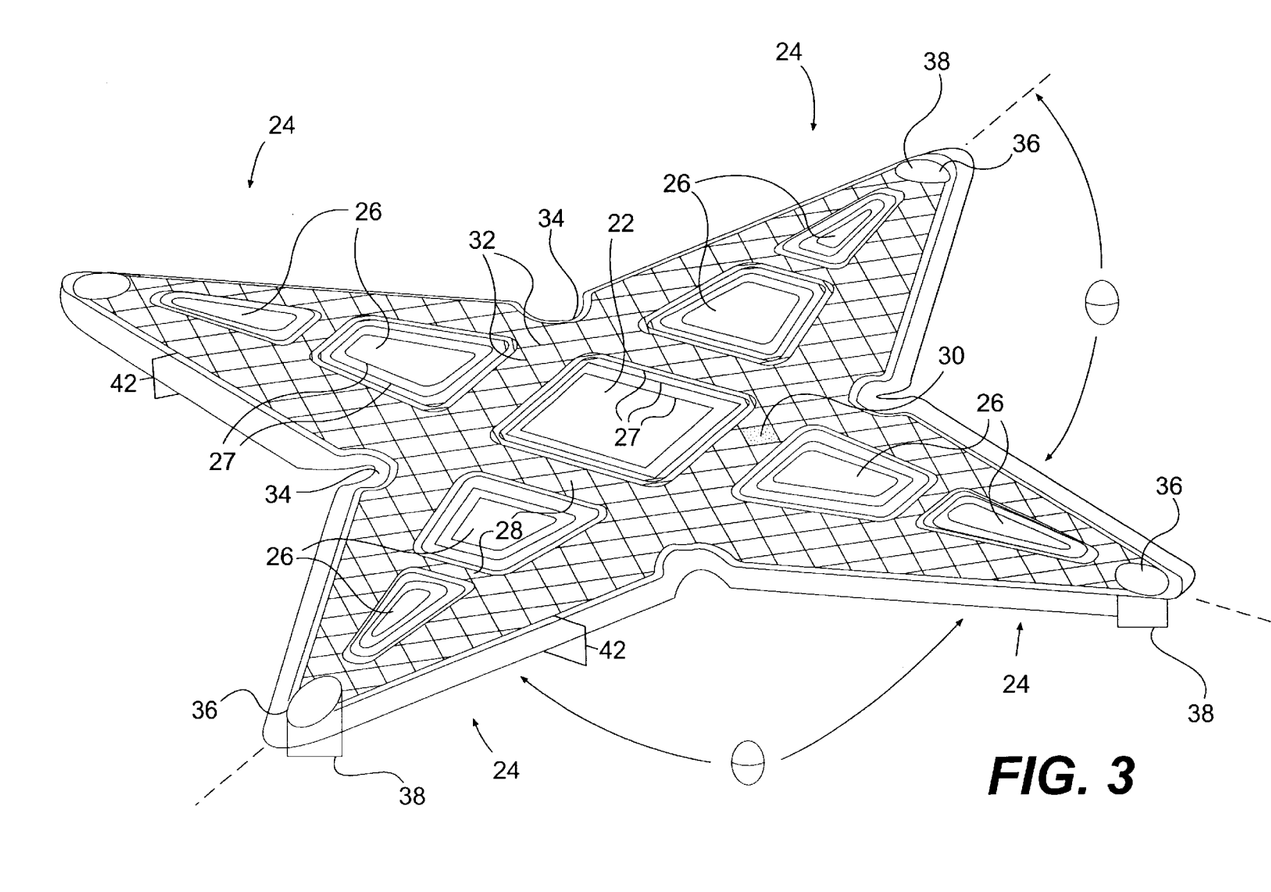
FIG. 3 is a perspective view of a second embodiment of the present invention.

A second embodiment of the present invention is illustrated in FIG. 3. Structures in the second embodiment similar to the first embodiment are denoted with like reference numerals. In the second embodiment of the present invention, the traction device 20 includes a reduced number of stepped wall transitions 44. Preferably, the number of stepped wall transitions 44 is approximately two. However, other numbers of stepped wall transitions 44 are not beyond the scope of the present invention.

With this reduced number of transitions, the traction device 20 of the second embodiment is more massive and readily grasps or abruptly contacts the terrain surrounding a wheel of a motor vehicle. The second embodiment of the present invention is preferably designed for terrains which do not include paved road surfaces. Such a design permits the traction device 20 to more readily engage or grasp terrains that are soft or are less resistive as compared with paved road surfaces. The second embodiment further includes the inverted step walls 27 disposed within each primary and secondary chambers 22, 26.

In FIG. 4, a traction system 46 according to the present invention is shown. The traction system 46 includes a plurality of traction devices 20 which are operatively linked together around a wheel 48 of a motor vehicle. The traction devices 20 are operatively linked together by a plurality of rope fastening links 40 which engage with a first rope 50 having end rings 66, second ropes 51, and rigid fastening devices 64. The rope fastening links 40, ropes 50 and 51, and rigid fastening devices 64 comprise the wheel hardware associated with the traction system 46.

The rigid fastening devices 64 are preferably threaded turn buckles. However, other rigid fastening devices 64 are not beyond the scope of the present invention. Other rigid fastening devices 64 include threaded fasteners with wing nuts or regular hexagonal nuts, threaded bolts with hexagonal nuts, springs, hooks, and other like fastening devices.

Figure 4B:
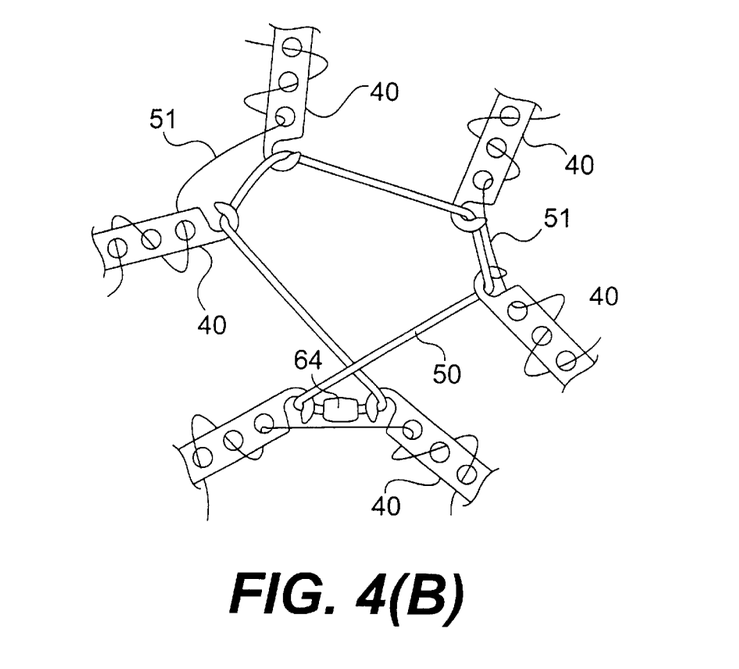
FIG. 4(B) is a schematic of the outward or non-vehicle facing side of the hardware for the traction system of the present invention.
Figure 4C:
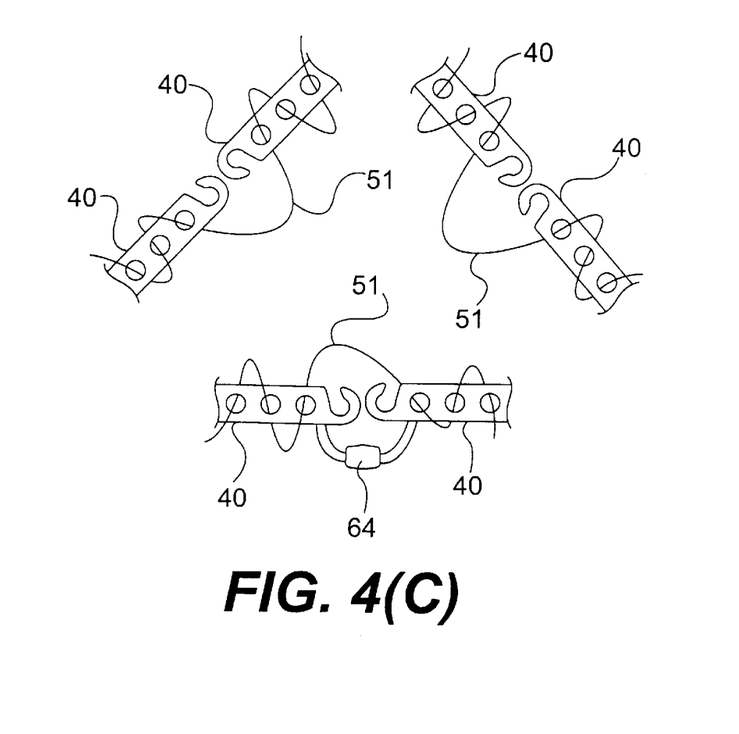
FIG. 4(C) is schematic of the inward or vehicle facing side of the mounting hardware for the traction system of the present invention.

FIG. 4(B) illustrates the orientation of the first and second ropes 50, 51 and a rigid fastening device 64 with respect to rope fastening links 40 for a side of wheel facing outwardly or away from a vehicle. FIG. 4(C) illustrates the orientation of second ropes 51 and a rigid fastening device 64 with respect to rope fastening links 40 for a side of wheel facing inwardly or towards a vehicle. For the side of the wheel facing the vehicle, a first rope 50 is preferably not employed. However, if additional tension is needed, the first rope 50 can be employed on the vehicle facing side of the traction system 46.

The rope fastening links 40 have a substantially planar shape (see FIGS. 5 and 6). This shape permits the rope fastening links 40 to contact the surface of a sidewall C of a wheel 48 of vehicle in a substantially smooth manner. With this orientation of the rope fastening links 40, only tension with rope 50 is needed to maintain the traction devices 20 in their predetermined positions along the circumference of the wheel 48.

The wheel hardware of the traction system 46 is preferably designed such that assembly of the traction system does not require the use of additional tools, such as, wrenches, pliers, hammers etc. The design of the wheel mounting hardware of the traction system 46 is also designed such that installation can be performed in a very rapid manner. Such a requirement is critical in situations where driving conditions change rapidly.

For example, installation time is critical when snow or ice begins to accumulate on paved road surfaces.

As illustrated in FIG. 5, the rope fastening links 40 are designed a such that all that is needed to attach the traction system 46 to a wheel 48 of a vehicle is a rope that is fed through first, second, and third apertures 52, 54 and 56 respectively. A fourth aperture 58 is preferably operatively linked to the fastening mechanism 38 of attachment regions 24. The rope fastening length 40 preferably includes a hook portion 60. Hook portion 60 permits connection of one fastening link 40 to another along a length of a rope 50. The rope fastening link 40 further includes a projection 62 disposed between the second and third apertures 54 and 56 of the rope fastening link 40. This projection 62 provides for frictional engagement with the rope 50 as tension is applied to the rope 50 when the rope 50 is pulled through second and third apertures 54 and 56.

The apertures 54 and 56 in combination with the projection 62 provide for a self locking mechanism for the rope 50 which permits rapid and easy installation of the mounting hardware of the traction system 46. The rope fastening link 40 is preferably made of a ferrous alloy such as stainless steel, but other materials are not beyond the scope of the present invention. Other materials include but are not limited to, nonferrous alloys, ceramic materials, polymers, composite materials and combinations thereof.

In FIG. 6, the connection between an attachment region 24 of a traction device 20 and a rope fastening link 40 is illustrated. The fastening mechanism 38 is preferably integrally molded with the rope fastening link 40 and the traction device 20. In other words, the fourth aperture 58 is filled with the material forming fastening mechanism 38 while fastening mechanism 38 is molded or integral with the aperture 36 of the attachment region 24 of the traction device 20.

Figure 7:
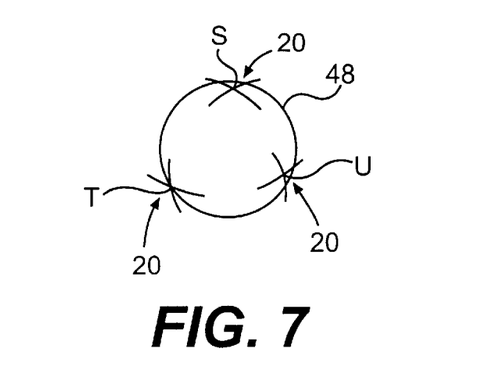
FIG. 7 is a schematic of the outward or non-vehicle facing side of the traction system of the present invention.
Figure 8:
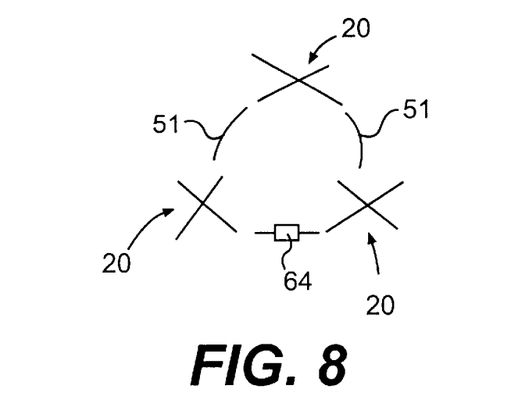
FIG. 8 is schematic of the inward or vehicle facing side of the mounting hardware for the traction system of the present invention.
Figure 9:
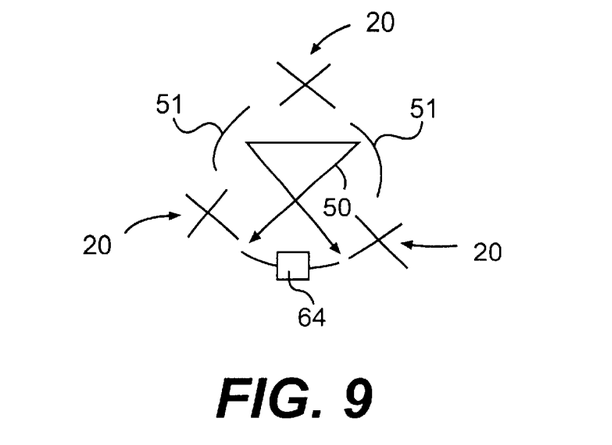
FIG. 9 is a schematic of the outward or non-vehicle facing side of the traction system of the present invention.

FIGS. 7, 8, and 9 illustrate a method of assembling an exemplary traction system 46 of the present invention. The first step as illustrated in FIG. 7 includes draping traction devices 20 at the twelve O'clock (denoted by reference numeral S), four O'clock (denoted by reference numeral U), and eight O'clock (denoted by reference numeral T) positions. The second step as illustrated in FIG. 8 includes tensioning the second ropes 51 and the rigid fastening device 64 on the vehicle facing side or interior side of the traction system 46. The third step as illustrated in FIG. 9 includes tensioning second ropes 51 and the rigid fastening device 64 on the side of the wheel facing outwardly or away from the vehicle. Another step includes feeding the first rope 50 through the hooks 60 of each rope fastening link 40 and securing the first rope 50 in an orientation as illustrated in FIG. 4. A final step includes applying additional tension to the second ropes 51 and the rigid fastening device 64.

Accordingly, as seen in FIGS. 4, 7, 8 and 9, the plurality of the tread devices are attached to the wheel of the vehicle while the wheel of the vehicle is in a stationary position.

The present invention provides for a method of increasing traction of a wheel of a vehicle. The method of the present invention includes operatively linking a plurality of traction devices 20 together as illustrated in FIG. 4. In the preferred embodiment of the present invention, three traction devices 20 are disposed at substantially equal angles in a balanced fashion around a wheel of a vehicle. However, the number of traction devices 20 is not limited to the number illustrated in FIG. 4.

The method for increasing traction of a wheel of a vehicle further includes the steps of dispersing at least one of fluids, solids, and fluid/solid mixtures adjacent to the wheel of a vehicle with chambers 22, 26 disposed in each traction device 20. The method for increasing traction of a wheel of a vehicle further includes linking the traction devices 20 with ropes 50 and rope fastening links without the use of additional tools such as wrenches, pliers, hammers, etc..

The present invention provides both a method and apparatus for increasing traction of a wheel of a vehicle that is easily and rapidly installed on a vehicle. The invention increases traction of a wheel of a vehicle and is durable yet nonabrasive to paved road surfaces. The invention includes a chamber which is capable of dispersing at least one of fluids, solids, and fluid-solid mixtures present in a terrain adjacent to a motor vehicle.

The present invention provides a traction device and traction system that is self tensioning and self-centering on a wheel of a vehicle. The traction device and traction system of the present invention is self cleaning when a vehicle tire transverses or penetrates through at least one of fluids, solids, and fluid-solid mixtures. The invention provides for a smoother ride of a vehicle while simultaneously providing a tremendous gripping force and substantially reducing wear on a leading edge of each traction device.

The invention being thus described, it will be obvious that the same may be varied in many ways. Such variations are not to be regarded as a departure from the spirit and scope of the invention, and all such modifications as would be obvious to one skilled in the art were intended to be included within the scope of the following claims.

What is claimed is:

1. A traction device comprising:
   a polygonal member having a number of attachment regions for operatively connecting said member to an adjacent traction device, wherein adjacent attachment regions define an angle therebetween, each angle including an apex and a substantially arcuate notch disposed at a respective apex; and
   a chamber with a predetermined number of sides being disposed within a central region of said polygonal member, the number of attachment regions being substantially equal to the predetermined number of said sides, said chamber being capable of dispersing at least one of fluids, solids, and fluid-solid mixtures away from said traction device.

2. The traction device of claim 1, wherein said chamber is a primary chamber, the traction device further comprising a plurality of secondary chambers being disposed within said polygonal member and adjacent to said primary chamber, said primary and said secondary chambers being capable of dispersing at least one of fluids, solids, and fluid-solid mixtures.

3. The traction device of claim 2, wherein each attachment region has at least one secondary chamber.

4. The traction device of claim 1, wherein each attachment region tapers in size relative to said primary chamber.

5. The traction device of claim 1, wherein each attachment region has a substantially V-shape.

6. The traction device of claim 1, wherein each angle is substantially obtuse.

7. The traction device of claim 1, wherein each attachment region includes a fastening mechanism.

8. The traction device of claim 7, wherein each fastening mechanism includes a lug device, said lug device conforms to a shape of an end of a respective attachment region.

9. The traction device of claim 8, wherein each lug device is operatively linked to a rope fastening link, each link including a plurality of apertures and a hook.

10. The traction device of claim 1, wherein said chamber is defined by wall members, each wall member having a plurality of subchambers disposed on a surface thereof.

11. The traction device of claim 10, wherein each subchamber has a substantially diamond shape.

12. The traction device of claim 1, wherein each attachment region has a tapering thickness.

13. The traction device of claim 12, wherein said thickness decreases in a direction away from said central region of said polygonal member.

14. The traction device of claim 12, wherein said polygonal member is made of at least one of plastic and rubber.

15. A traction system comprising:
   a plurality of tread devices, each tread device including a chamber being capable of dispersing at least one of fluids, solids, and fluid-solid mixtures away from said devices; and
   a plurality of attaching devices for operatively linking said plurality of tread devices together with at least one rope fastening link and to at least one wheel of a vehicle, said tread members substantially increasing traction of the at least one wheel moving through at least one of said fluids, solids, and fluid-solid mixtures.

16. The traction system of claim 15, wherein each tread device includes:
   a polygonal member having a number of attachment regions; and
   a respective chamber with a predetermined number of sides being disposed within a central region of said polygonal member, the number of attachment regions being substantially equal to the predetermined number of said sides.

17. The traction system of claim 16, wherein each chamber is a primary chamber, each traction device further comprising a plurality of secondary chambers being disposed within a respective polygonal member and adjacent to a respective primary chamber, each primary and each secondary chambers being capable of dispersing at least one of fluids, solids, and fluid-solid mixtures.

18. A method for increasing traction of a wheel of a vehicle, the method comprising the steps of:

operatively linking a plurality of tread devices together;

centering each of the tread devices on the wheel with attachment regions disposed on respective tread devices, each tread device having adjacent attachment regions with a substantially obtuse angle between each adjacent attachment region;

attaching the plurality of tread devices to the wheel of the vehicle; and dispersing at least one of fluids, solids, and fluid-solid mixtures adjacent to the wheel of the vehicle with chambers disposed in said tread devices.

19. The method of claim 18, wherein the step of attaching the plurality of tread devices includes a step of linking the tread devices with ropes and rope fastening links.

20. The method of claim 19, wherein the step of linking the tread devices with ropes and rope fastening links includes a step of coupling the rope fastening links to lug devices disposed in attachment regions of each tread device.

21. The method of claim 18, further comprising the step of substantially reducing vibration of said tread devices with attachment regions having tapered thicknesses.

22. The method of claim 10, wherein the step of dispersing includes a step of dispersing at least one of fluids, solids, and fluid-solid mixtures adjacent to the wheel of the vehicle with wall members having a plurality of subchambers disposed on a surface thereof.

23. A traction device comprising:

polygonal member having a number of attachment regions for operatively connecting said member to an adjacent traction device, wherein each attachment region has a tapering thickness; and a chamber with a predetermined number of sides being disposed within a central region of said polygonal member, the number of attachment regions being substantially equal to the predetermined number of said sides, said chamber being capable of dispersing at least one of fluids, solids, and fluid-solid mixtures away from said traction device.

24. A method for increasing traction of a wheel of a vehicle, the method comprising the steps of:

operatively linking a plurality of tread devices together;

centering each of the tread devices on the wheel with attachment regions disposed on respective tread devices, each tread device having adjacent attachment regions between each adjacent attachment region;

attaching the plurality of tread devices to the wheel of the vehicle while the wheel of the vehicle is in a stationary position; and dispersing at least one of fluids, solids, and fluid-solid mixtures adjacent to the wheel of the vehicle with chambers disposed in said tread devices when said wheel is in motion.

* * * * *